United States Patent
Bjorkengren (10) Patent No.: US 9,814,007 B2
(45) Date of Patent: Nov. 7, 2017

(54) SYNCHRONIZING TIME AMONG TWO OR MORE DEVICES

(71) Applicant: Intel Corporation, Santa Clara, CA (US)

(72) Inventor: Ulf Bjorkengren, Bjarred (SE)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 14/866,325

(22) Filed: Sep. 25, 2015

(65) Prior Publication Data

US 2017/0094618 A1    Mar. 30, 2017

(51) Int. Cl.
*H04J 3/06*     (2006.01)
*H04W 56/00*    (2009.01)

(52) U.S. Cl.
CPC ................................. *H04W 56/001* (2013.01)

(58) Field of Classification Search
CPC ....... H04J 3/06; H04J 3/0644; H04W 56/001; H04L 5/00
USPC ......................................................... 370/350
See application file for complete search history.

(56) References Cited

U.S. PATENT DOCUMENTS

| | | | |
|---|---|---|---|
| 6,707,867 B2 | 3/2004 | Diepstraten et al. | |
| 7,339,922 B2 | 3/2008 | Ho | |
| 2007/0266119 A1 | 11/2007 | Ohly | |
| 2008/0160989 A1* | 7/2008 | Favre | H04W 36/36 455/424 |
| 2010/0057955 A1 | 3/2010 | Foster | |
| 2010/0098111 A1 | 4/2010 | Sun et al. | |
| 2010/0296406 A1 | 11/2010 | Rahbar | |
| 2011/0019698 A1 | 1/2011 | Akae et al. | |
| 2011/0035511 A1* | 2/2011 | Biederman | G04G 7/00 709/248 |
| 2011/0228834 A1 | 9/2011 | Umayabashi et al. | |
| 2014/0177528 A1 | 6/2014 | Na et al. | |
| 2015/0092642 A1 | 4/2015 | Geboff et al. | |

OTHER PUBLICATIONS

International Search Report and Written Opinion dated Nov. 30, 2016 for International Application No. PCT/US2016/048665, 13 pages.

* cited by examiner

*Primary Examiner* — Chi H Pham
*Assistant Examiner* — Alexander O Boakye
(74) *Attorney, Agent, or Firm* — Schwabe, Williamson & Wyatt, P.C.

(57) ABSTRACT

A time server device may send a first message to a client device, capturing and storing the time value of the time server clock when the first message is sent. When the first message is received by the client device, the client device starts a timer. At some later time, the time server device sends a second message to the client device that includes the stored time value. The clock of the client device may be updated based at least in part on the value of the timer and the received time value.

24 Claims, 7 Drawing Sheets

Time Server

400

Non-transitory computer-readable storage medium 402,
as may be implemented in embodiments of FIG. 2

Programming instructions 404
to cause a computing apparatus, in response to execution of the
instructions by a processor of the computing apparatus, to practice
aspects of embodiments of the processes of FIG. 3

Client

Non-transitory computer-readable storage medium 602,
as may be implemented in embodiments of FIG. 2

Programming instructions 604
to cause a computing apparatus, in response to execution of the
instructions by a processor of the computing apparatus, to practice
aspects of embodiments of the processes of FIG. 5

SYNCHRONIZING TIME AMONG TWO OR MORE DEVICES

TECHNICAL FIELD

The present disclosure relates generally to the field of data processing, and more particularly, to synchronizing time among a plurality of user equipment (UE) devices.

BACKGROUND

Data processing, communications, and other systems and/or networks use clocks in various devices. Frequently, synchronizing the time value of these clocks, or adjusting the time value of these clocks so they are able to operate and/or coordinate with each other, improves the overall function of the system and/or network. Historically, clock synchronization between wired and wirelessly connected devices over the Internet has relied on solutions such as Internet Time Protocol (NTP). These solutions typically, involve external multiple time servers and round-trip delay measurements in reasonably complex implementations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of techniques, apparatuses, systems and computer-readable media for synchronizing the clocks of UE devices are disclosed. In some embodiments, a time server UE device may send a first message via a communication controller to a second communication controller of a client UE device, and then cause a time value from the server UE device clock that indicates the time when the first message was sent, to be stored. At some later time, a second message may be sent from the time server UE device to the communication controller of the client UE device that includes the stored time value. In some embodiments, a client UE device may receive a first message from a time server UE device and then cause, immediately upon receipt of the first message, a timer to be started. Later, it may receive a second message from the time server UE device that includes the time at which the time server UE device sent the first message, and the clock of the client UE device will be updated based at least in part on the value of the timer and the received time value.

In embodiments, synchronizing time may not involve round trip measurements or similar complex operations. In addition, it may exclude the non-real-time host system performance from the critical path of updating the clock of a client device. In embodiments, time synchronization between one time server device and multiple client devices in proximity of the time server, may be particularly suitable to Bluetooth® Low Energy coverage.

In the following detailed description, reference is made to the accompanying drawings which form a part hereof wherein like numerals may designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
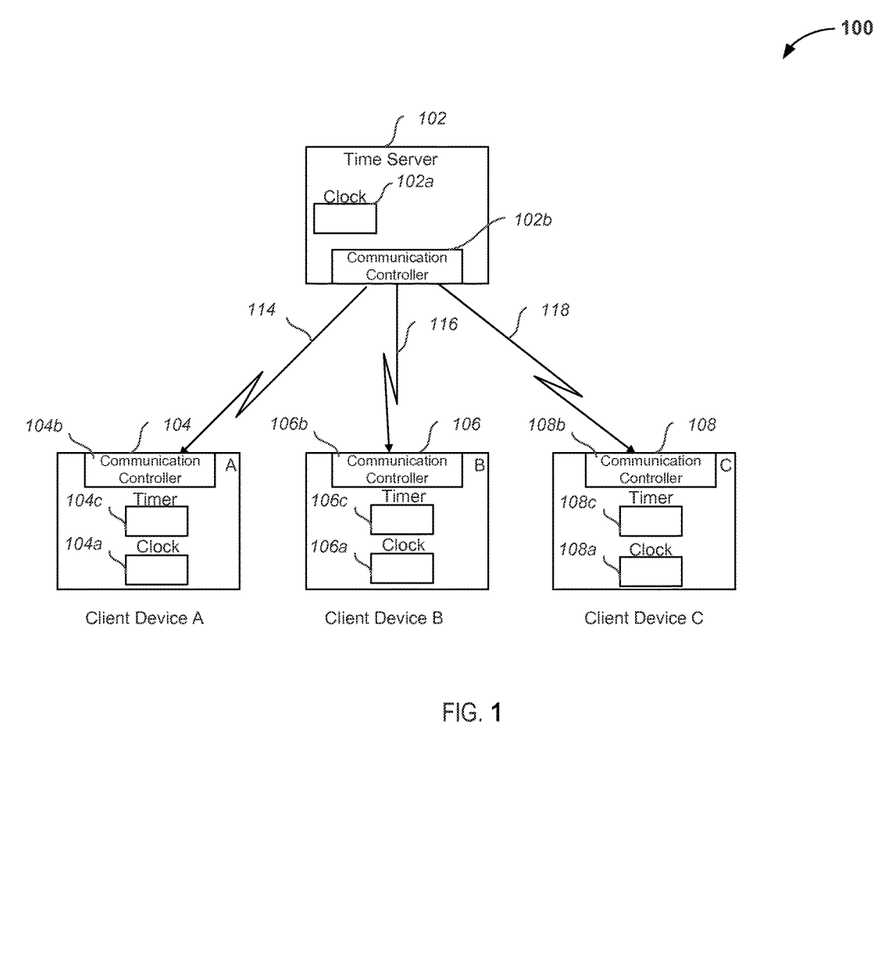
FIG. 1 is a block diagram of a network of UE devices configured for synchronizing time to a time server, in accordance with various embodiments.

FIG. 1 depicts an illustrative block diagram of a network of UE devices 100 that may be configured for synchronizing time, according to various embodiments. In embodiments, a number of UE devices including a time server UE device 102 and one or more client UE devices 104, 106, 108 may be coupled with each other, incorporated with the teachings of the present disclosure to synchronize time. More specifically, client UE device 104*b*, 106*b*, and 108*b* may use the clock value of the time server UE 102*a* to update the clock values of the one or more client UE devices 104*a*, 106*a*, 108*a*. In embodiments, updates may be done on a periodic basis or on the basis of any other event. Hereinafter, for ease of understanding, time server UE 102 and client UE devices 104, 106*b*, and 108*b* may simply be referred to as time server 102 and client devices 104*b*, 106*b*, and 108*b*.

The time server 102 may include a clock 102a that indicates a value for the current time for the time server. In non-limiting embodiments, the clock may be set to universal coordinated time, local standard time, local daylight savings time, number of seconds from a particular event, or a non-standard time value. Similarly, the client devices 104, 106, 108 may each have respective clocks 104a, 106a, 108a that may be similar to time server clock 102a, and may be updated.

In embodiments, the time server 102 may communicate with the client devices 104, 106, 108 via communication links 114, 116, 118. In embodiments, these communication links may be wired and/or wireless. In wired embodiments, the communication links, in non-limiting examples, may be implemented with Ethernet (over local or wide area networks) or serial communication links. In wireless embodiments, the communication links, in non-limiting examples, may be implemented using Bluetooth®, Bluetooth low energy, Wi-Fi, and/or cellular technology.

In embodiments, each device 102, 104, 106, 108 may have a respective communication controller 102b, 104b, 106b, 108b used to send and/or receive signals from another device. In embodiments, the time server device 102 may have a communication controller 102b able to transmit but not able to receive a signal, for example as a beacon apparatus. In embodiments, a client device 104, 106, 108 may have a communication controller 104b, 106b, 108b configured to receive but not transmit a signal. In embodiments, the communications from one communication controller to another may occur at or near the speed of light.

In embodiments, a client device may also include a timer 104c, 106c, 108c that may be used to determine the time interval between the receipt of a first message from a time server device 102 and the receipt of a second message from the time server device 102.

Figure 2:
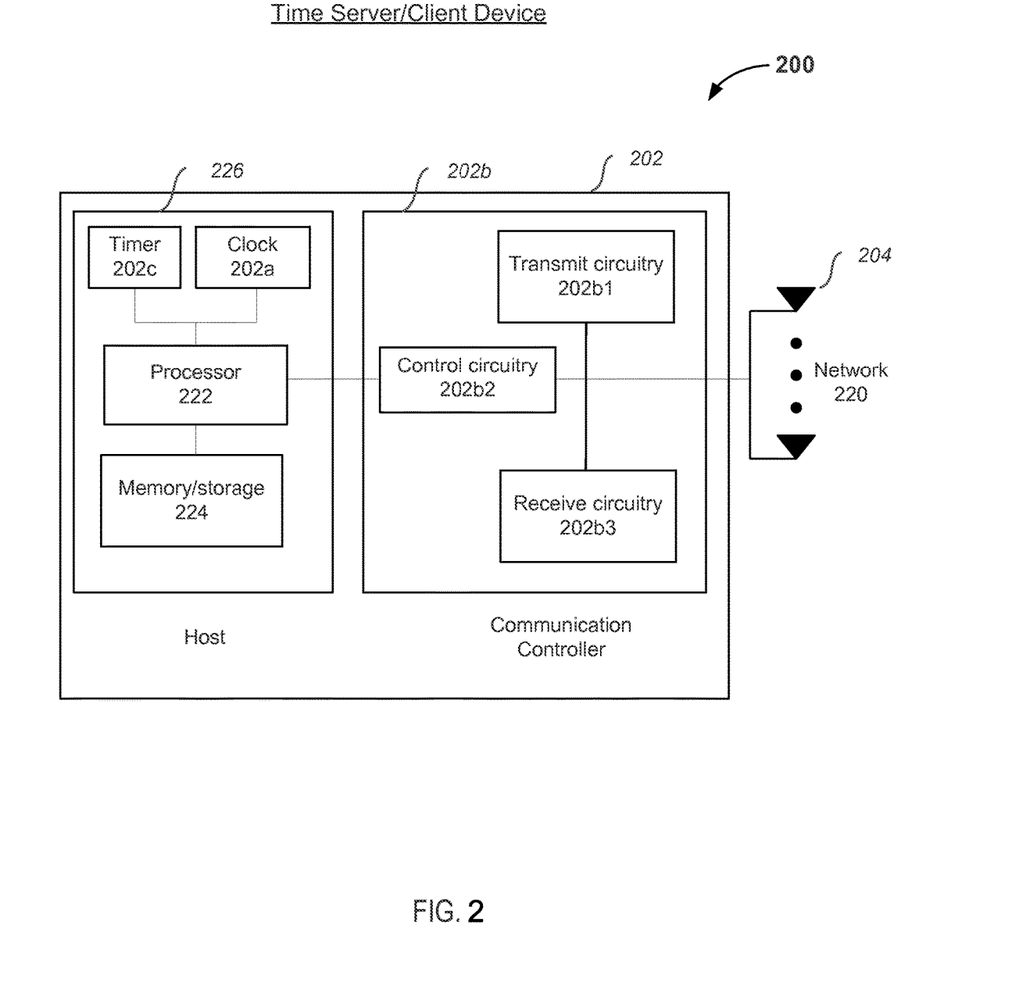
FIG. 2 is a block diagram of a time server and/or client UE device, in accordance with various embodiments.

FIG. 2 illustrates using diagram 200, a time server device and/or a client device, 202 which may be similar to the time server device 102 of FIG. 1 and/or the client devices 104, 105, 108 of FIG. 1. The time server and/or client device may include a communications controller 202b, which may be similar to the communication controller 102b in FIG. 1, and/or a host 226 portion of the device 202 that may interact with the communications controller 102b.

In embodiments, the host portion 226 may be coupled to the communication controller 202b. In embodiments, the components, as shown and described, of the host 226 may reside in the communication controller 202b. Similarly, the components, as shown and described, of the communication controller 202b may reside in the host 226. For example, one or more, or all, of the components of the host 226 may reside within control circuitry 202b2 of the communication controller 202b.

In embodiments, the host 226 may include processor 222 that may be coupled to memory/storage 224, and to clock 202a, which may be similar to the clock 102a in FIG. 1. In embodiments, the processor 222 may also be coupled to a timer 202c, as may be implemented in a client device, such as 104c, 106c, 108c. In embodiments, the host 226 may be implemented as a real-time system, or as a non-real-time system.

In embodiments, the communication controller 202b may be implemented as a real-time system that may be able to react to events with a short and/or deterministic latency using transmit circuitry 202b1, control circuitry 202b2, and receive circuitry 202b3, that may be connected to antenna 204. Antenna 204 may be to provide access to a communications network 220, which may be similar to the connections 114, 116, 118 shown in FIG. 1. In embodiments, the communication controller 102b may initiate interrupts to the host 226 and/or the processor 222 within the host, which may be to allow the processor 222 to perform one or more actions immediately or nearly immediately upon receiving the interrupt. These actions may, in embodiments, include to cause the processor 222 to identify a value from a clock 202a immediately prior to or immediately subsequent to a message transmission by the transmit circuitry 202b1, start a timer 202c upon receipt of a message by receive circuitry 202b3, and/or identify a value from a timer 202c upon receipt of a message from receive circuitry 202b3.

In embodiments, when the host 226 requests that the communication controller 202b to transmit a message, the communication controller 202b may not immediately transmit the message, and instead may wait for a timeslot assigned to it for message transmission. In these embodiments, the communication controller 202b may issue an interrupt back to the host 226 immediately after the message has been transmitted. In these embodiments, within the host 226, the processor 222 may immediately, or within a known delayed time period, service the interrupt and identify a time value from the clock 202a that may be stored in memory/storage 224. In embodiments, the communication controller 202b may issue the interrupt at the start, the middle, or at the end of the message transmission.

The communication controller 202b may be user equipment (UE) circuitry, or some other type of circuitry, in accordance with various embodiments. In embodiments, the communication controller 202b may be incorporated into or otherwise be a part of a UE device such as an Internet of Things (IoT) device, or some other type of electronic device. In embodiments, the communication controller 202b may include radio transmit circuitry 202b1 and receive circuitry 202b3 coupled to control circuitry 202b2. In embodiments, the transmit 202b1 and/or receive circuitry 202b3 may be elements or modules of transceiver circuitry (not shown). The communication controller 202b may be coupled with one or more plurality of antenna elements of one or more antennas 204 to connect with network 220. The UE apparatus circuitry and/or the components of the electronic device circuitry may be configured to perform operations similar to those described elsewhere in this disclosure.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the communication controller 202b may be implemented in, or functions associated with the circuitry may be implemented by, one or more software or firmware modules.

Embodiments of the communication technology described herein may be related to the 3GPP long term evolution (LTE) or LTE-advanced (LTE-A) standards. For example, terms or entities such as eNB, mobility management entity (MME), UE, etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

Memory/storage 224 may be used to load and store data and/or instructions, to be executed by processor 222, for example, for synchronizing clocks of various client devices with the clock of a time server device. Memory/storage 224, in one embodiment, may include any combination of suitable volatile memory (e.g., dynamic random access memory (DRAM)) and/or non-volatile memory (e.g., Flash memory).

Figure 3:
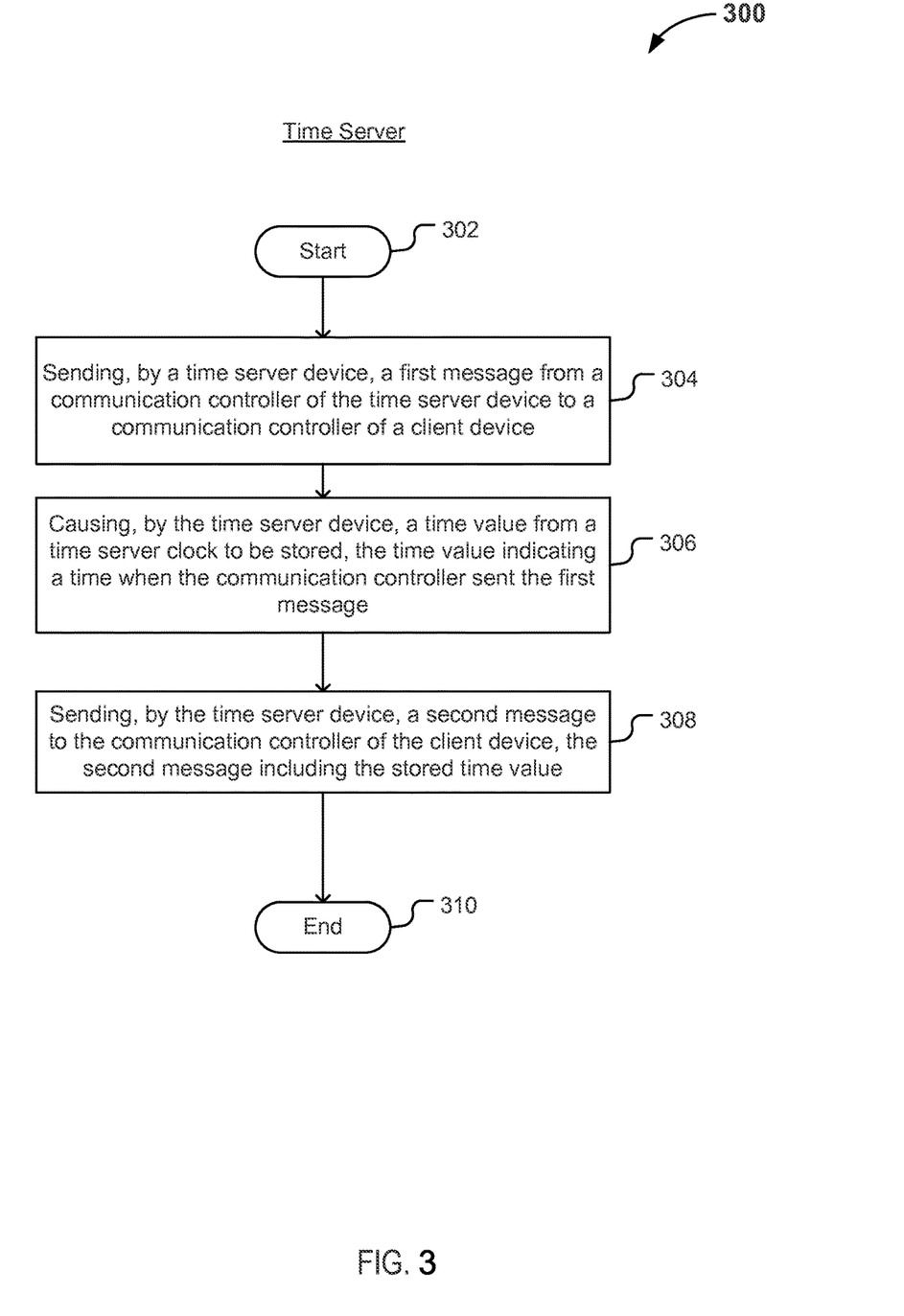
FIG. 3 is a flow diagram of an illustrative process for a time server UE device, in accordance with various embodiments.

FIG. 3 is a flow diagram of an illustrative process 300 for a time server, in accordance with various embodiments. It may be recognized that, while the operations of the process 300 are arranged in a particular order and illustrated once each, in various embodiments, one or more of the operations may be repeated, omitted or performed out of order. For illustrative purposes, operations of the process 300 may be described as performed by the time server device 202 (which may be embodied in the time server device 102), but the operations of the process 300, including individual operations of the process 300, may be performed by any suitably configured computing device or collection of computing devices.

Referring now to FIG. 3, the process 300 may start at block 302.

At block 304, the process may send, by the time server device 202, a first message from the communication controller of time server device to a communication controller of a client device 104b, 106b, 108b. The first message may be identified by one or more components of the host 226, including the processor 222, memory/storage 224, and other elements that may include sensors and/or measuring components (not shown). The message may be sent by one or more components of the communication controller 202b, which may include control circuitry 202b2 to identify the first message from the host 226, and transmit circuitry 202b1 that may transmit the first message to the client device over the network 220 via antennas 204. In other embodiments, the transmit circuitry 202b1 may transmit the message to network 220 by a wired communication, via an Ethernet or a serial connection.

In embodiments, the first message may contain a message identification to be included in the first message that will allow a receiving client device to uniquely identify the first message among a plurality of received messages. In embodiments, the message may also include other data which may or may not be related to message identification.

At block 306, the process may cause, by time server device 202, a time value from the time server device clock 202a to be stored, the time value indicating a time when the communication controller 202b sent the first message. In embodiments, the communication controller 202b may immediately cause an interrupt to be sent to the host 226 at the time the first message is sent, the interrupt indicating that a clock value from clock 202a may be captured and stored by the processor 222 in the memory/storage 224. In embodiments, the message identification of the first message may be stored and/or related to the stored time in another way. In embodiments, there may be a time delay between the sending of the interrupt by the communication controller 202b and the capturing of a time value from clock 202a of the time server. In these embodiments, the time delay may be a known or may be a predictable amount of time, which may be the value zero or some other time value, that may be subtracted from the stored clock value so that the captured clock value more accurately represents the time value of the clock 202a at the time the message was actually sent by the communication controller 202b. In other embodiments, the communication controller 202b, through control circuitry 202b2 or through some other mechanism, may obtain the time value of the clock 202a without using processor 222, and then subsequently cause the processor 222 to store that time value, along with the associated message identification, in memory/storage 224.

At block 308, the process may send, by time server device 202, a second message to the communication controller of a client device 104, 106, 108, the second message including the stored time value. In embodiments, the second message may also contain the message identification of the first message that was sent, which may allow the device receiving the second message to associate the second message received with the first message received. The second message may be created and/or identified in a way similar to the first message, and may include additional information that may or not be related to time synchronization.

At block 310, the process may end.

Figure 4:
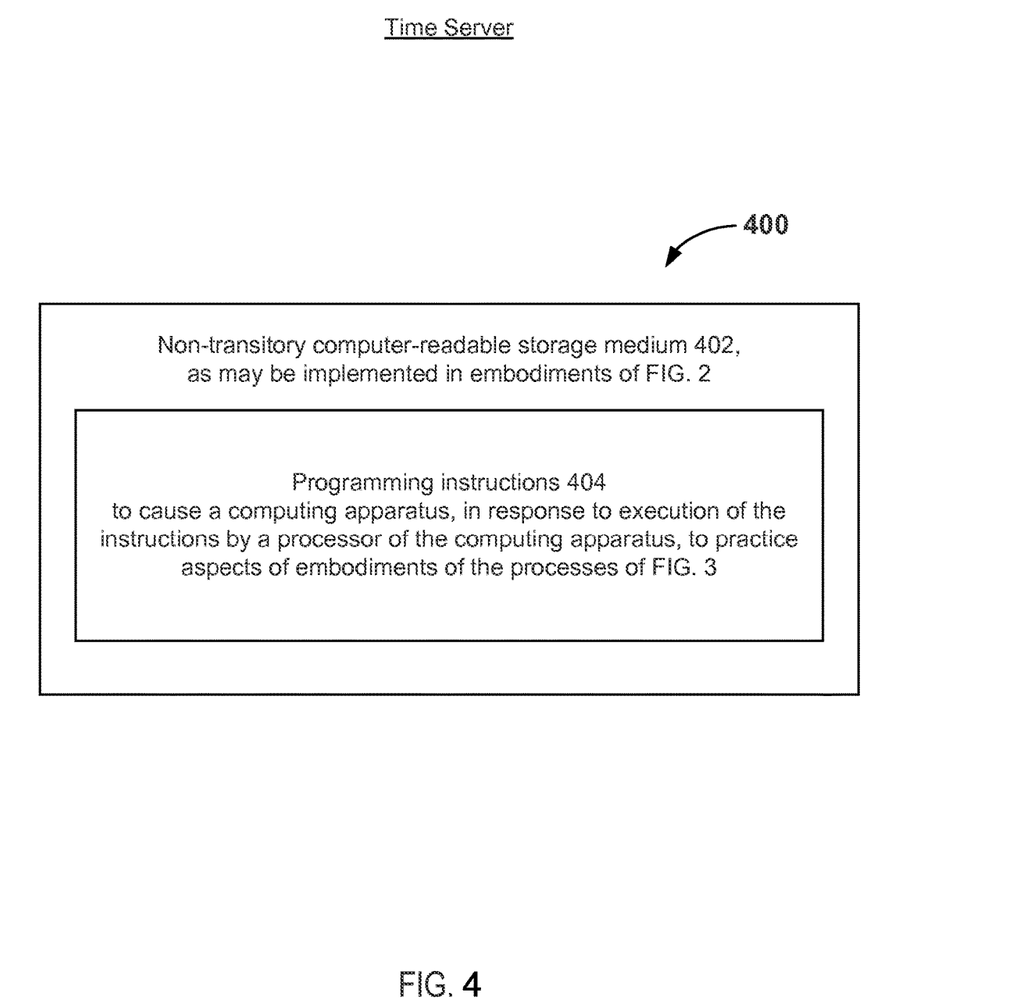
FIG. 4 is a block diagram of a non-transitory computer readable storage medium to implement one or more aspects of a time server UE device, in accordance with various embodiments

FIG. 4 illustrates a block diagram of a non-transitory computer readable storage medium having instructions to implement one or more aspects of process 300, in accordance with various embodiments. Instructions 404 of non-transitory computer-readable computer readable media 402, when executed by systems/devices may cause the systems/devices to implement the methods, for performing the above-described time server process as disclosed herein. In some embodiments, such computer readable media may be included in a memory or storage device of any of the computing devices in the system 100 or the time server device 200, as illustrated in FIGS. 1 and 2 (e.g., the storage device 224). For example, computational logic included in a storage device of any computing device may include assembler instructions 404 supported by a processing device included in the computing device, or may include instructions 404 in a high-level language, such as C, that can be compiled by the processing device. In some embodiments, a permanent copy of the computer readable instructions 404 may be placed into permanent storage in the storage device in the factory or in the field (through, for example, a machine-accessible distribution medium (not shown), such as a compact disc). In some embodiments, a permanent copy of the computer readable instructions 404 may be placed into permanent storage in the storage device through a suitable communication pathway (e.g., from a distribution server).

Figure 5:
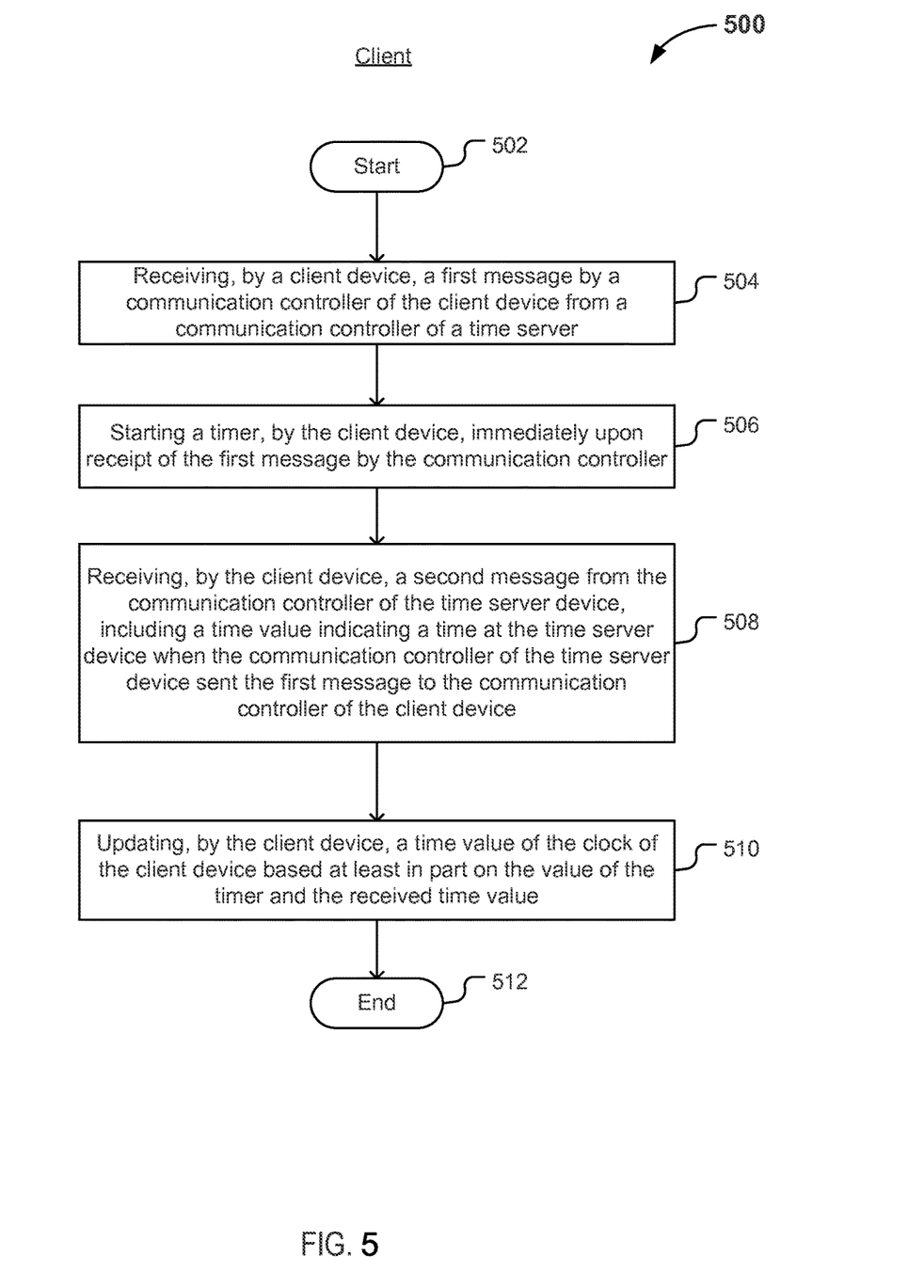
FIG. 5 is a flow diagram of an illustrative process for a client UE device, in accordance with various embodiments.

FIG. 5 is a flow diagram of an illustrative process for a client device, in accordance with various embodiments. It may be recognized that, while the operations of the process 500 are arranged in a particular order and illustrated once each, in various embodiments, one or more of the operations may be repeated, omitted or performed out of order. For illustrative purposes, operations of the process 500 may be described as performed by the client device 202 (which may be embodied in the client device 104, 106, 108), but the operations of the process 500, including individual operations of the process 500, may be performed by any suitably configured computing device or collection of computing devices. The process may start at block 502.

At block 504, the process may receive, by the client device 202, a first message via the communication controller of client device 202*b* from a communication controller of a time server device 102*b*. The first communication message may include a message identification, and may or may not include other information relevant to time synchronization. The first message may be received by the client device receive circuitry 202*b*3. The message may have been delivered via network 220 and by antenna 204 connected to the communication controller 202*b* of the client device 202. In embodiments, the message may have been received over a wired connection.

At block 506, the process may start a timer, by the client device 202, immediately upon receipt of the first message by the communication controller 202*b*. In embodiments, the client device control circuitry 202*b*2 of the communication controller 202*b* may send an interrupt to the host 226 of the client device 202 to cause the timer 202*c* to start. In embodiments, there may be a time delay between the receipt of the message by the communication controller 202*b* and start of the timer 202*c*. In embodiments, this time delay may be a known or a may be a predictable amount of time, which may include interrupt servicing, that may be added to the timer 202*c* value so that the timer value more accurately represents the elapsed time at the client device 202 after the first message was received at the client device 202. In embodiments, the first message may include identification information that may allow the client 202 to uniquely identify this first message from the plurality of messages the client may subsequently receive from one or more devices.

At block 508, the process may receive, by the client device 202, a second message from the communication controller of the time server 102*b*, the second message including a time value indicating the time at the time server 102 when the communication controller of the time server 102*b* sent the first message to the communication controller of the client 202*b*. In embodiments, a second message may be sent from the communication controller of the time server 102*b* that may include the stored time value of the time the first message was sent by the communication controller of the time server 102*b*. The second message may also include an identification of the first message received by the client device 202.

At block 510, the process may update, by the client device 202, a time value of the clock of the client device 202*a* based at least in part on the value of the timer 202*c* and the received time value. In embodiments, when the communication controller 202*b* receives the second message, the communication controller may send an interrupt to the host 226 of the client device to capture a current value of the timer 202*c*. In embodiments, there may be a time delay between the receipt of the second message by the communication controller 202*b*, and the identification of a value of the timer 202*c*. In embodiments, this time delay may be a known or may be a predictable amount of time, that may be due to interrupt handling delays, that may be subtracted from the captured timer value so that the captured timer value may more accurately represents the elapsed time at the client device 202 between the time the first message was received by the communication controller 202*b* and when the second message was received by the communication controller 202*b*. In embodiments, the updated value of the client device clock 202*a* may be determined by adding the received time value in the second message to the captured timer value in the client device 202. In embodiments where the communication network 220 may transfer messages from the communication controller of the time server device 102*b* and the communication controller of the client device 202*b* at or near the speed of light, the updated value of the client device clock 202*a* may be extremely close to the value of the time server device clock 102*a*. In embodiments, the client device 202 may identify the second message received as related to the first message received by comparing the message identifier in the first message with an indication of the first message identifier in the second message.

Figure 6:
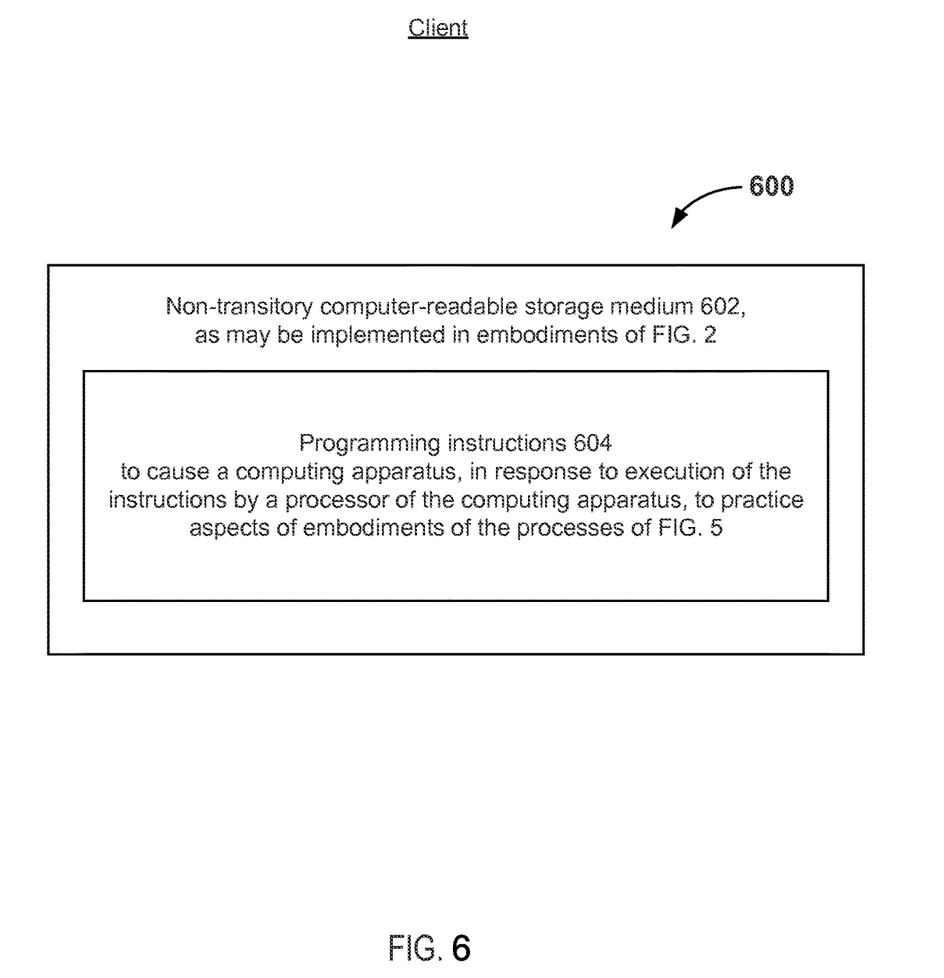
FIG. 6 is a block diagram of a non-transitory computer readable storage medium to implement one or more aspects of a client UE device, in accordance with various embodiments.

FIG. 6 is a block diagram of a non-transitory computer readable storage medium having instructions to implement one or more aspects of process 500, in accordance with various embodiments. Diagram 600 may indicate non-transitory computer-readable computer readable media 602 that may implement methods, systems and/or devices for performing the above-described as disclosed herein. In some embodiments, such computer readable media may be included in a memory or storage device of any of the computing devices in the system 100 or the client device 200, as illustrated in FIGS. 1 and 2 (e.g., the storage device 224). For example, computational logic included in a storage device of any computing device may include assembler instructions 604 supported by a processing device included in the computing device, or may include instructions 604 in a high-level language, such as C, that can be compiled by the processing device. In some embodiments, a permanent copy of the computer readable instructions 604 may be placed into permanent storage in the storage device in the factory or in the field (through, for example, a machine-accessible distribution medium (not shown), such as a compact disc). In some embodiments, a permanent copy of the computer readable instructions 604 may be placed into permanent storage in the storage device through a suitable communication pathway (e.g., from a distribution server).

Figure 7:
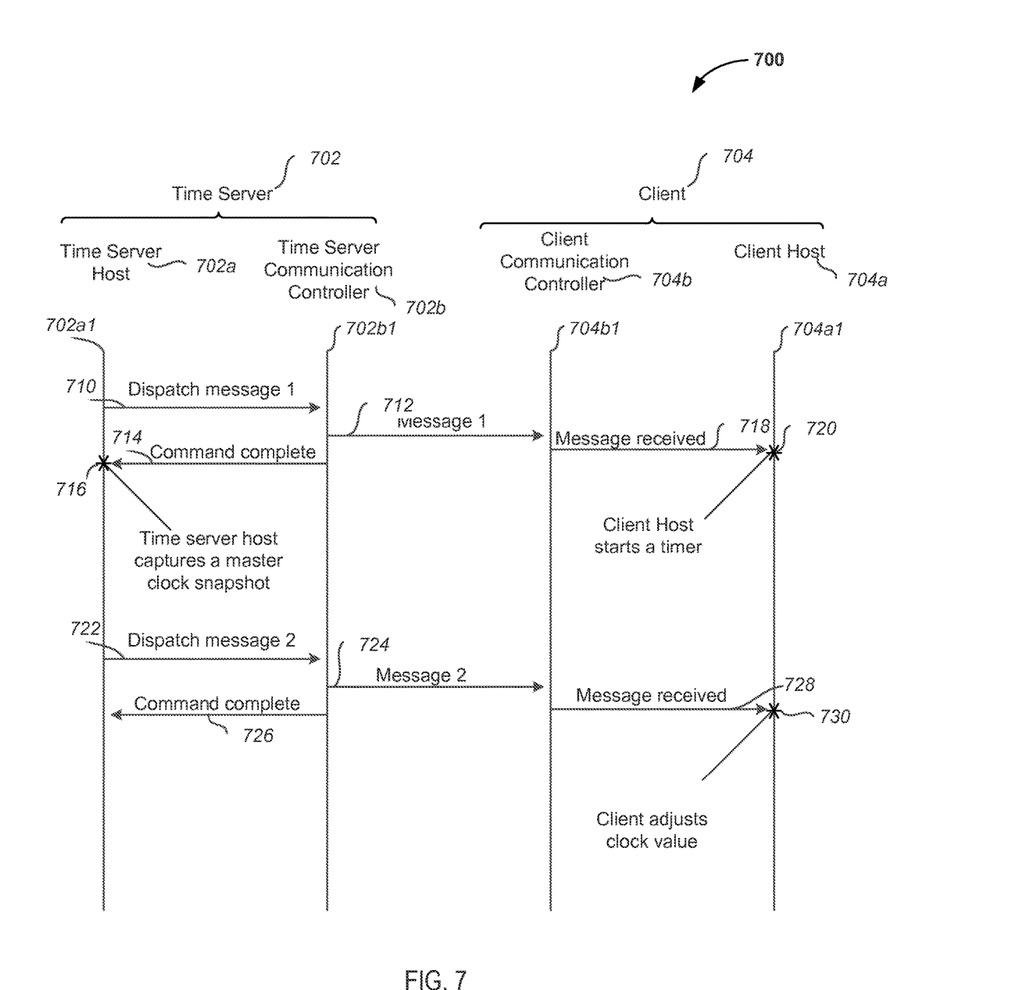
FIG. 7 is a timing diagram of a time server and a client, in accordance with various embodiments.

FIG. 7 is a timing diagram 700 of a time server and a client, in accordance with various embodiments. Diagram 700 illustrates a time server device 702, which may be similar to the time server device 102 in FIG. 1, cooperating with a client device 704, which may be similar to the client device 104 in FIG. 1, to synchronize the time of client device 704 to the time of time server device 702. The time server device 702 may include two components, a time server host 702*a*, which may be similar to the host 226 of FIG. 2, and a time server communication controller 702*b*, which may be similar to the communication controller 202*b* of FIG. 2. Activity of the time server host 702*a* may be represented on the time server host timeline 702*a*1. Activity of the time server communication controller 702*a* may be represented on the time server communication controller timeline 702*b*1. The client device 704 may include two components, a client host 704*a*, which may be similar to the host 226 of FIG. 2, and the client communication controller 704*b*, which may be similar to the communication controller 202*b* of FIG. 2. Activity of the client host 704*a* may be represented on the client host timeline 704*a*1. Activity of the client communication controller 704*b* may be represented on the client communication controller timeline 704*b*1.

Timing diagram 700 illustrates one or more embodiments of the methods described in FIG. 3 and FIG. 5. In embodiments, the time server host 702*a* may dispatch a message 1 request 710 to the time server communication controller 702*b*. In response, the time server communication controller 702*b* may send message 1 712 to the client communication controller 704*b*. After sending message 1, the time server communication controller 702*b* may send a command complete interrupt 714 back to the time server host 702*a*. At this point, the time server host 702*a* may capture a master clock snapshot 716. In embodiments, the command complete interrupt 714 may be serviced by the time server host 702*a* at a known, or determinable, amount of time after message 1 712 was sent by the client communication controller 704*b*. In embodiments, the time server host 702*a* may adjust the captured master clock snapshot based on this known, or determinable, amount of time. In embodiments, the master clock (not shown) may be similar to the clock 102*a* of FIG. 1, and may be used as the clock to which the clocks of other devices may be synchronized.

In embodiments, when the client communication controller 704*b* receives message 1 712, the client communication controller 704*b* may send a message received interrupt 718 to the client host 704*a*. Thereupon, the client host 704*a* may then start a timer 720. In embodiments, the elapsed time between the receipt of message 1 712 by the client communication controller 704*b* and the servicing by the client host 704*a* of the message received interrupt 718 to start the timer may be a known, or determinable, amount of time. In embodiments, the client host 704*a* may adjust the timer (not shown), which may be similar to timer 104*c* of FIG. 1, by the known, or determinable, amount of time.

In embodiments, subsequent to sending dispatch message 1 710, the time server host 702*a* may send a dispatch message 2 722 to the time server communication controller 702*b*. In embodiments, this message may include the captured master clock snapshot, which may or may not have been adjusted, as may be described above. The time server communication controller 702*b* may then send a second message, message 2 724 to the client communication controller 704*b*. After this is completed, the time server communication controller 702*b* may send a command complete interrupt 726 back to the time server host 702*a*. After receiving message 2 724, the client communication controller 704*b* may then generate and send a message received interrupt 728 to the client host 704*a*. In embodiments, the message received interrupt 728 may include the value of the captured master clock snapshot. The client host 704*a* may then adjust its clock value 730 by adding the received captured master clock snapshot contained within the sent message 2 724 to the value of the client host timer. In embodiments, the adjusted client clock value may include adjustments made to allow for time between the receipt of message 2 724 by the client communication controller 704*b* and the time at which the client host 704*a* may adjust the client clock value.

The following paragraphs provide a number of examples of embodiments of the present disclosure.

Example 1 is a user equipment, UE, apparatus for computing, comprising: one or more processors; a clock coupled to the one or more processors; a communication controller coupled to the one or more processors; and transmit logic to be operated by the one or more processors to send a first message via the communication controller to a second communication controller of a second UE apparatus; cause a time value from the UE apparatus clock to be stored, the time value to indicate a time when the communication controller sent the first message; and send a second message to the second communication controller of the second UE apparatus, the second message to include the stored time value.

Example 2 may include the subject matter of Example 1, wherein to cause a time value from the UE apparatus clock to be stored further includes the transmit logic is to cause an interrupt immediately after the communication controller sent the first message; and wherein the UE apparatus further comprises control logic to be operated by the one or more processors, upon receipt of the interrupt, to immediately store the time value to indicate when the communication controller sent the first message.

Example 3 may include the subject matter of Example 2, wherein the communication controller is a real-time system able to generate interrupts with a deterministic latency; and wherein the time value to indicate when the communication controller sent the first message is adjusted for the deterministic latency.

Example 4 may include the subject matter of Example 1, wherein the first message includes an indication it is a first time synchronization message.

Example 5 may include the subject matter of Example 1, wherein the first message includes an identifier to be used in the second message.

Example 6 may include the subject matter of Example 1, wherein the first message is a wireless message or the second message is a wireless message.

Example 7 may include the subject matter of Example 1, wherein the time value is based on coordinated universal time.

Example 8 may include the subject matter of Example 1, wherein the communication controller is a selected one of a Bluetooth® controller, a Bluetooth Low Energy controller, a Wi-Fi controller, or a cellular technology controller.

Example 9 is a method for synchronizing time with a computing user equipment, UE, apparatus comprising: sending, by the UE apparatus, a first message from a communication controller of the UE apparatus to a second communication controller of a second UE apparatus; causing, by the UE apparatus, a time value from a UE apparatus clock to be stored, the time value indicating a time when the communication controller sent the first message; and sending, by the UE apparatus, a second message to the second communication controller of the second UE apparatus, the second message including the stored time value.

Example 10 may include the subject matter of Example 9, wherein causing, by the UE apparatus, a time value from the UE apparatus clock to be stored further includes causing an interrupt immediately after the sending the first message, the interrupt causing the storing of the time value indicating when the communication controller sent the first message.

Example 11 may include the subject matter of Example 10, wherein the communication controller is a real-time system able to generate interrupts with a deterministic latency; and wherein the time value to indicate when the communication controller sent the first message is adjusted for the deterministic latency.

Example 12 may include the subject matter of Example 9, wherein the first message includes an identifier to be used in the second message.

Example 13 may include the subject matter of Example 9, wherein the first message is a wireless message or the second message is a wireless message.

Example 14 may include the subject matter of Example 9, wherein the time value is based on coordinated universal time.

Example 15 may include the subject matter of Example 9, wherein the communication controller is a selected one of a Bluetooth® controller, a Bluetooth Low Energy controller, a Wi-Fi controller, or a cellular technology controller.

Example 16 is a user equipment, UE, apparatus for computing, comprising: one or more processors; a clock coupled to the one or more processors; a communication controller connected to the one or more processors; receive logic to be operated by the one or more processors to: receive a first message via the communication controller from a second communication controller of a second UE apparatus; cause, immediately upon receipt of the first message by the communication controller, a timer to be started; and receive a second message from the second communication controller of the second UE apparatus that includes a time value to indicate a time at the second UE apparatus when the second communication controller of the second UE apparatus sent the first message to the communication controller of the UE apparatus; and control logic to be operated by the one or more processors to update the clock of the UE apparatus, based at least in part on the value of the timer and the received time value.

Example 17 may include the subject matter of Example 16, the control logic further to: add the value of the timer to the received time value to create an updated time value for the clock of the UE apparatus; and update the clock of the UE apparatus to the updated time value.

Example 18 may include the subject matter of Example 16, wherein the first message further includes a first message identification and the second message further includes a second message identification; and further including when the first message identification does not match the second message identification, to not update the clock of the UE apparatus.

Example 19 may include the subject matter of Example 16, wherein to cause, immediately upon receipt of the first message by the communication controller a timer to be started further includes: to generate and to send, by the communication controller, an interrupt message to the one or more processors to start the timer; and to start, by the one or more processors, the timer.

Example 20 may include the subject matter of Example 17, wherein, to start the timer further includes: to identify a deterministic timer delay that includes a time between the receipt of the first message by the communication controller and the time the interrupt message was sent and a time between when the interrupt message was sent and the time the timer was started; and to adjust the timer value based at least on the deterministic timer delay.

Example 21 is a method for synchronizing time in a user equipment, UE, comprising: receiving, by the UE apparatus, a first message by a communication controller of the UE apparatus from a second communication controller of a second UE apparatus; starting, by the UE apparatus, immediately upon receipt of the first message by the communication controller, a timer; receiving, by the UE apparatus, a second message from the second communication controller of the UE apparatus, including a time value indicating a time at the second UE apparatus when the second communication controller of the second UE apparatus sent the first message to the communication controller of the UE apparatus; and updating, by the UE apparatus, a time value of the clock of the UE apparatus based at least in part on the value of the time and the received time value.

Example 22 may include the subject matter of Example 21, wherein updating a time value of the clock of the UE apparatus is based at least in part on the value of the time and the received time value further includes updating a time value of the clock by adding the value of the timer to the received time value.

Example 23 may include the subject matter of Example 21, wherein the first message further includes a first message identification and the second message further includes a second message identification; and wherein only when the first message identification matches the second message identification, updating a time value of the clock by adding the value of the timer to the received time value.

Example 24 may include the subject matter of Example 21, wherein starting, by the UE apparatus, immediately upon receipt of the first message by the communication controller, a timer further comprises: generating and sending, by the communication controller, an interrupt message to a processor to start the timer; and starting, by the processor, the timer.

Example 25 may include the subject matter of Example 24, wherein starting the timer further includes: identifying a deterministic timer delay that includes a time between receiving the first message by the communication controller and starting the timer; and adjusting the timer value based at least on the deterministic timer delay.

Example 26 is one or more non-transitory computer-readable media comprising instructions that cause a user equipment (UE) apparatus, in response to execution of the instructions by the UE apparatus, to: send a first message from a communication controller of the UE apparatus to a second communication controller of a second UE apparatus; cause a time value from a UE apparatus clock to be stored, the time value indicating a time when the communication controller sent the first message; send a second message to the second communication controller of the second UE apparatus, the second message including the stored time value.

Example 27 may include the subject matter of Example 26, wherein to cause a time value from the UE apparatus clock to be stored further includes to cause an interrupt immediately after the first message is sent, the interrupt to cause the storing of the time value indicating when the communication controller sent the first message.

Example 28 may include the subject matter of Example 27, wherein the communication controller is a real-time system able to generate interrupts with a deterministic latency; and wherein the time value to indicate when the communication controller sent the first message is adjusted for the deterministic latency.

Example 29 may include the subject matter of Example 26, wherein the first message includes an identifier to be used in the second message.

Example 30 may include the subject matter of Example 26, wherein the first message is a wireless message or the second message is a wireless message.

Example 31 may include the subject matter of Example 26, wherein the time value is based on coordinated universal time.

Example 32 may include the subject matter of Example 26, wherein the communication controller is a selected one of a Bluetooth® controller, a Bluetooth Low Energy controller, a Wi-Fi controller, or a cellular technology controller.

Example 33 is one or more non-transitory computer-readable media comprising instructions that cause a user equipment (UE) apparatus, in response to execution of the instructions by the UE apparatus, to: receive a first message by a communication controller of the UE apparatus from a second communication controller of a second UE apparatus; start a timer immediately upon receipt of the first message by the communication controller; receive a second message by the communication controller from the second communication controller of the UE apparatus, including a time value indicating a time at the second UE apparatus when the second communication controller of the second UE apparatus sent the first message to the communication controller of the UE apparatus; and update a time value of the clock of the UE apparatus based at least in part on the value of the time and the received time value.

Example 34 may include the subject matter of Example 33, wherein to update a time value of the clock of the UE apparatus is based at least in part on the value of the time and the received time value further includes to update a time value of the clock by adding the value of the timer to the received time value.

Example 35 may include the subject matter of Example 33, wherein the first message further includes a first message identification and the second message further includes a second message identification; and wherein only when the first message identification matches the second message identification, to update a time value of the clock by the value of the timer added to the received time value.

Example 36 may include the subject matter of Example 33, wherein to start the timer further includes: to identify a deterministic timer delay that includes a time between receiving the first message by the communication controller and starting the timer; and to adjust the timer value based at least on the deterministic timer delay.

Example 37 is a computing device to provide a time server, comprising: means for sending a first message from a communication controller of the UE apparatus to a second communication controller of a second UE apparatus; means for causing a time value from a UE apparatus clock to be stored, the time value indicating a time when the communication controller sent the first message; and means for sending a second message to the second communication controller of the second UE apparatus, the second message including the stored time value.

Example 38 may include the subject matter of Example 37 or any other example herein, wherein means for causing a time value from the UE apparatus clock to be stored further includes means for causing an interrupt immediately after the sending the first message, the interrupt causing the storing of the time value indicating when the communication controller sent the first message.

Example 39 may include the subject matter of Example 38 or any other example herein, wherein the communication controller is a real-time system able to generate interrupts with a deterministic latency; and wherein the time value to indicate when the communication controller sent the first message is adjusted for the deterministic latency.

Example 40 may include the subject matter of Example 37 or any other example herein, wherein the first message includes an identifier to be used in the second message.

Example 41 may include the subject matter of Example 37 or any other example herein, wherein the first message is a wireless message or the second message is a wireless message.

Example 42 may include the subject matter of Example 37 or any other example herein, wherein the time value is based on coordinated universal time.

Example 43 may include the subject matter of Example 37 or any other example herein, wherein the communication controller is a selected one of a Bluetooth® controller, a Bluetooth Low Energy controller, a Wi-Fi controller, or a cellular technology controller.

Example 44 is a computing device for synchronizing time to a time server, comprising: means for receiving a first message by a communication controller of the UE apparatus from a second communication controller of a second UE apparatus; means for starting, immediately upon receipt of the first message by the communication controller, a timer; means for receiving a second message from the second communication controller of the UE apparatus, including a time value indicating a time at the second UE apparatus when the second communication controller of the second UE apparatus sent the first message to the communication controller of the UE apparatus; and means for updating a time value of the clock of the UE apparatus based at least in part on the value of the time and the received time value.

Example 45 may include the subject matter of Example 44 or any other example herein, wherein means for updating a time value of the clock of the UE apparatus is based at least in part on the value of the time and the received time value further includes means for updating a time value of the clock by adding the value of the timer to the received time value.

Example 46 may include the subject matter of Example 44 or any other example herein, wherein the first message further includes a first message identification and the second message further includes a second message identification; and means for updating a time value of the clock by adding the value of the timer to the received time value only when the first message identification matches the second message identification.

Example 47 may include the subject matter of Example 44 or any other example herein, wherein means for starting, immediately upon receipt of the first message by the communication controller, a timer further comprises: means for generating and means for sending, by the communication controller, an interrupt message to a processor to start the timer; and means for starting the timer.

Example 48 may include the subject matter of Example 47 or any other example herein, wherein means for starting the timer further includes: means for identifying a deterministic timer delay that includes a time between receiving the first message by the communication controller and a time when the timer is started; and means for adjusting the timer value based at least on the deterministic timer delay.

The invention claimed is:

1. A user equipment, UE, apparatus for computing, comprising:
one or more processors;
a clock coupled to the one or more processors;
a communication controller coupled to the one or more processors; and
transmit logic to be operated by the one or more processors to:
send a first message via the communication controller to a second communication controller of a second UE apparatus;
cause a time value from the UE apparatus clock to be stored, the time value to indicate a time when the communication controller sent the first message, wherein upon receipt of the first message by the second communication controller the second UE apparatus is to start a timer; and
send a second message to the second communication controller of the second UE apparatus, the second message to include the stored time value, where upon receipt of the second message by the second communication controller, the second UE apparatus is to update a clock of the second UE apparatus based upon the stored time value and a value of the timer.

2. The UE apparatus of claim 1,
wherein to cause a time value from the UE apparatus clock to be stored further includes the transmit logic is to cause an interrupt immediately after the communication controller sent the first message; and
wherein the UE apparatus further comprises control logic to be operated by the one or more processors, upon receipt of the interrupt, to immediately store the time value to indicate when the communication controller sent the first message.

3. The UE apparatus of claim 2,
wherein the communication controller is a real-time system able to generate interrupts with a deterministic latency; and
wherein the time value to indicate when the communication controller sent the first message is adjusted for the deterministic latency.

4. The UE apparatus of claim 1, wherein the first message includes an indication it is a first time synchronization message.

5. The UE apparatus of claim 1, wherein the first message includes an identifier to be used in the second message.

6. The UE apparatus of claim 1, wherein the first message is a wireless message or the second message is a wireless message.

7. The UE apparatus of claim 1, wherein the time value is based on coordinated universal time.

8. The UE apparatus of claim 1, wherein the communication controller is a selected one of a Bluetooth® controller, a Bluetooth Low Energy controller, a Wi-Fi controller, or a cellular technology controller.

9. A method for synchronizing time with a computing user equipment, UE, apparatus comprising:
sending, by the UE apparatus, a first message from a communication controller of the UE apparatus to a second communication controller of a second UE apparatus,
wherein upon receipt of the first message by the second communication controller the second UE apparatus is to start a timer;
causing, by the UE apparatus, a time value from a UE apparatus clock to be stored, the time value indicating a time when the communication controller sent the first message; and
sending, by the UE apparatus, a second message to the second communication controller of the second UE apparatus, the second message including the stored time value, where upon receipt of the second message by the second communication controller, the second UE apparatus is to update a clock of the second UE apparatus based upon the stored time value and a value of the timer.

10. The method of claim 9,
wherein causing, by the UE apparatus, a time value from the UE apparatus clock to be stored further includes causing an interrupt immediately after the sending the first message, the interrupt causing the storing of the time value indicating when the communication controller sent the first message.

11. The method of claim 10,
wherein the communication controller is a real-time system able to generate interrupts with a deterministic latency; and
wherein the time value to indicate when the communication controller sent the first message is adjusted for the deterministic latency.

12. The method of claim 9, wherein the first message includes an identifier to be used in the second message.

13. The method of claim 9, wherein the first message is a wireless message or the second message is a wireless message.

14. The method of claim 9, wherein the time value is based on coordinated universal time.

15. The method of claim 9, wherein the communication controller is a selected one of a Bluetooth® controller, a Bluetooth Low Energy controller, a Wi-Fi controller, or a cellular technology controller.

16. A user equipment, UE, apparatus for computing, comprising:
one or more processors;
a clock coupled to the one or more processors;
a communication controller connected to the one or more processors;
receive logic to be operated by the one or more processors to:
receive a first message via the communication controller from a second communication controller of a second UE apparatus;
cause, immediately upon receipt of the first message by the communication controller, a timer to be started; and
receive a second message from the second communication controller of the second UE apparatus that includes a time value to indicate a time at the second UE apparatus when the second communication controller of the second UE apparatus sent the first message to the communication controller of the UE apparatus; and
control logic to be operated by the one or more processors to update the clock of the UE apparatus, based at least in part on a value of the timer and the received time value.

17. The UE apparatus of claim 16, the control logic further to:
add the value of the timer to the received time value to create an updated time value for the clock of the UE apparatus; and
update the clock of the UE apparatus to the updated time value.

18. The UE apparatus of claim 16, wherein the first message further includes a first message identification and the second message further includes a second message identification; and
further including when the first message identification does not match the second message identification, to not update the clock of the UE apparatus.

19. The UE apparatus of claim 16, wherein to cause, immediately upon receipt of the first message by the communication controller a timer to be started further includes:
to generate and to send, by the communication controller, an interrupt message to the one or more processors to start the timer; and
to start, by the one or more processors, the timer.

20. The UE apparatus of claim 17, wherein to start the timer further includes:
to identify a deterministic timer delay that includes a time between the receipt of the first message by the communication controller and the time an interrupt message was sent and a time between when the interrupt message was sent and the time the timer was started; and
to adjust the value of the timer based at least on the deterministic timer delay.

21. One or more non-transitory computer-readable media comprising instructions that cause a user equipment (UE) apparatus, in response to execution of the instructions by the UE apparatus, to:
receive a first message by a communication controller of the UE apparatus from a second communication controller of a second UE apparatus;
start a timer immediately upon receipt of the first message by the communication controller;
receive a second message by the communication controller from the
second communication controller of the second UE apparatus, that includes a time value indicating a time at the second UE apparatus when the second communication controller of the second UE apparatus sent the first message to the communication controller of the UE apparatus; and update a time value of a clock of the UE apparatus based at least in part on a value of the time timer and the received time value.

22. The one or more non-transitory computer-readable media of claim 21, wherein to update a time value of the clock of the UE apparatus is based at least in part on the value of the timer and the received time value further includes to update a time value of the clock by adding the value of the timer to the received time value.

23. The one or more non-transitory computer-readable media of claim 21, wherein the first message further includes a first message identification and the second message further includes a second message identification;
   wherein the UE apparatus is caused to update a time value of the clock by the value of the timer added to the received time value, only when the first message identification matches the second message identification.

24. The one or more non-transitory computer-readable media of claim 21, wherein to start the timer further includes:
   to identify a deterministic timer delay that includes a time between receiving the first message by the communication controller and starting the timer; and
   to adjust the timer value of the timer based at least on the deterministic timer delay.

* * * * *